No. 808,926. PATENTED JAN. 2, 1906.
G. G. HUGHS.
WOOD CONVEYER.
APPLICATION FILED OCT. 11, 1905.
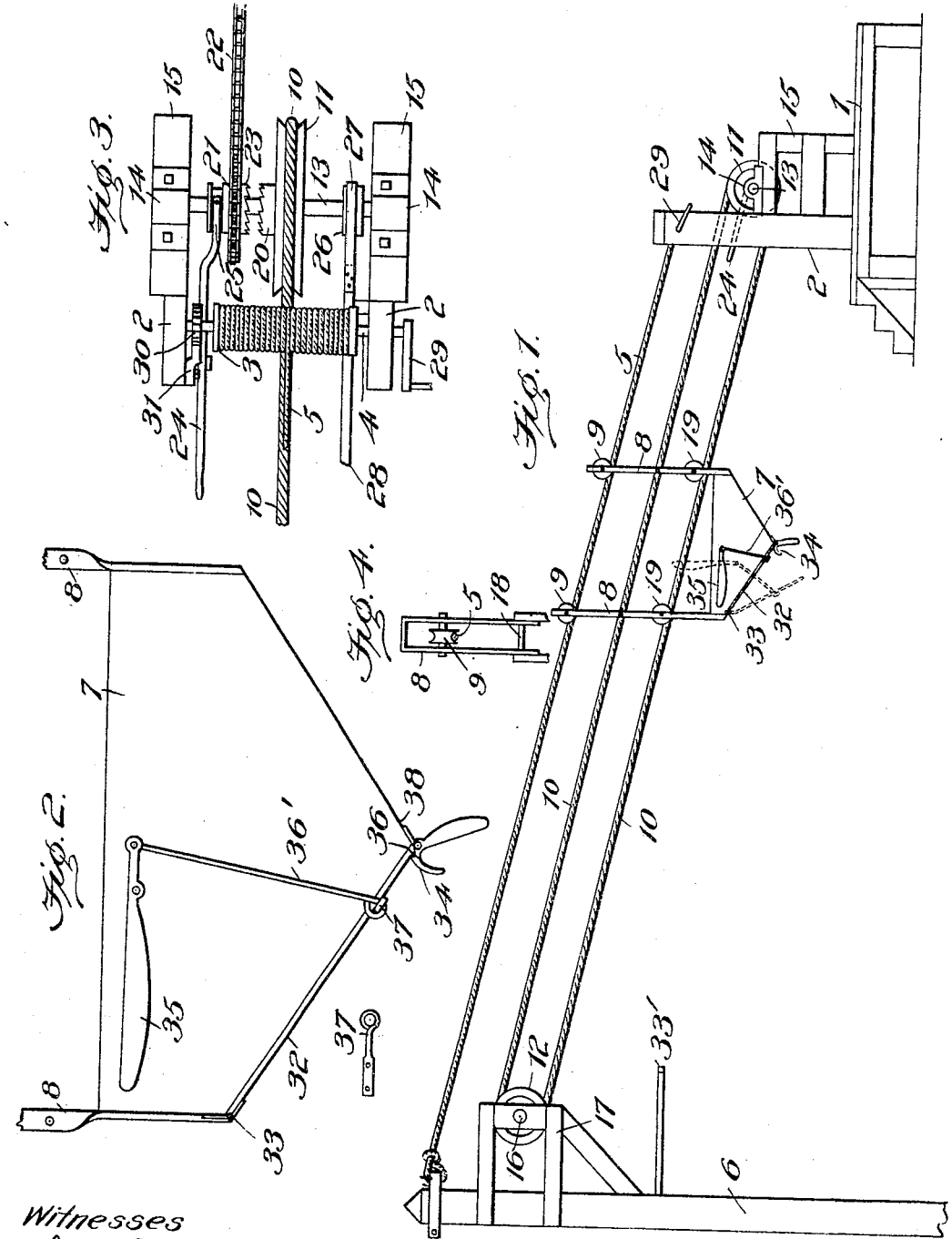
Witnesses
Inventor
G. G. Hughs,
By A. L. Jackson,
Attorney.

UNITED STATES PATENT OFFICE.

GEORGE G. HUGHS, OF FORT WORTH, TEXAS.

WOOD-CONVEYER.

No. 808,926.        Specification of Letters Patent.        Patented Jan. 2, 1906.

Application filed October 11, 1905. Serial No. 282,336.

*To all whom it may concern:*

Be it known that I, GEORGE G. HUGHS, a citizen of the United States, residing at Fort Worth, Texas, have invented a new and Improved Wood-Conveyer, of which the following is a specification.

This invention relates to means for conveying wood or other objects; and the object is to provide a practical device for hauling or conveying wood from a sawing or splitting machine to a convenient place of stacking the wood.

One of the objects of the invention is to provide a conveyer-box which will be automatically opened to let out the load and which will return to starting-point by gravity.

Other objects and advantages will be fully explained in the following description, and the invention will be more particularly pointed out in the claims.

Reference is had to the accompanying drawings.

Figure 1 is a side elevation of the apparatus composing my invention. Fig. 2 is an enlarged view of the conveyer box or carrier. Fig. 3 is a plan view of the driving-gear, also illustrating the means for regulating the tension of the suspension trolley-cable. Fig. 4 is a detail view of the hangers for the carrier.

Similar characters of reference are used to indicate the same parts throughout the several views.

The improved conveyer is generally operated from an elevated platform 1. Upright frame-pieces 2 are provided, and a trolley-cable spool 3 is journaled in said uprights by a suitable shaft 4. The trolley-cable 5 is attached to the spool 3 and at the other end is attached to a post or upright 6 at a point considerably higher than the spool 3. The carrier 7 is suspended on the cable 5 by means of hangers 8 and trolley-wheels 9. The carrier 7 is moved from place to place by the cable 10, and the cable 10 is mounted on pulleys 11 and 12. The cable 10 runs parallel with the trolley-cable 5. The pulley 11 is mounted on a shaft 13, which is journaled in bearings 14, and the bearings 14 are mounted on the frame 15. The pulley 12 is mounted on a shaft 16, which is journaled in the bracket-frame 17, which frame is attached to the post 6. The cable 10 is connected to the hangers 8 by means of a cross-rod 18. The hangers 8 consist of upper parts and lower parts pivotally jointed together, as shown in Fig. 4. The carrier 7 is supported to some extent on the cable 10, this cable being attached to the hangers 8 and pulleys 19 being mounted in the hangers 8 and running on the cable 10. The hangers 8 may consist of flat metal bars attached to the carrier 7 and twisted one-quarter around above the carrier. The cable 10 is driven by the pulley 11. Pulley 11 has a clutch 20 on the hub thereof. The pulley 11 is driven by a sprocket-wheel 21 and chain 22, which may be driven by any suitable power. The sprocket-wheel 21 has a cooperating clutch 23 on the hub adjacent to pulley 11, and the sprocket-wheel 21 may be thrown in and out of mesh with the pulley 11 by means of a lever 24, which is fulcrumed on the frame 2 and engages the hub of sprocket-wheel 21, this hub having an annular groove in the periphery thereof to be engaged by the lever 24, and this lever being provided with a yoke 25 for engaging the groove in the hub of sprocket-wheel 21. The clutches may be thrown in mesh as soon as the carrier 7 is loaded. The gearing will deliver the carrier to its destination. The clutches are then thrown out of mesh. The carrier will then return to starting-point by gravity. A friction-pulley 26 is mounted on the shaft 13, and a friction-brake 27 to operate on said friction-pulley is provided, and a lever 28 is provided for operating the brake 27. The brake 27 can be used to prevent the carrier from returning with too great speed or force. The tension of the trolley-cable 5 may be regulated by the crank 29 and held at the proper tension by the ratchet-wheel 30 and pivoted pawl or dog 31, which engages the wheel 30.

The carrier 7 is preferably constructed as a rectangular box with an angular bottom. The bottom is so constructed that wood placed in the box will slide to the lowest part. One-half 32 of the bottom is hinged at 33 and held in place at the other edge by weighted latches 34 and weighted levers 35. The latches 34 have catches 36, which engage the edge of the bottom piece 32, and these latches are curved at the front, so that the bottom piece will slide on the latches to its normal position to be caught by the latches. The other ends of the latches are weighted, so that the latches will hold the bottom piece 32 in place. The latches are hinged so that they may be tripped by a suitable tripping-bar 33', arranged in the path of the latches. As the carrier is about to pass the bar 33' the bar will trip the latches and let the bottom swing down and drop the load of wood. As the wood is stacked up it will in time become as high as the bar, and the wood itself will serve as the tripping-bar. When the load of wood falls from the carrier, the hinged bottom piece will be drawn back to its normal position by the weighted levers 35, which are fulcrumed on the sides of the carrier. The levers 35 are connected to the bottom piece 32 by link-rods 36', which are pivotally connected to the levers and which have eyes formed in the lower ends to engage similar eyes formed on straps 37, which may be attached to the bottom piece 32. It will be understood that there is a lever 35 on each side of the carrier with connecting-rod 36' strap 37. There may be any suitable number of the latches 34. These latches are hinged to the bottom piece 38 in any suitable manner. It is necessary to construct the hangers 8 in upper and lower sections and connect the same pivotally to permit freedom of movement of the carrier and to prevent binding.

Various changes may be made in the construction of the apparatus herein described without departing from my invention.

Having fully described my invention, what I claim as new, and desire to secure by Letters Patent, is—

1. A wood-conveyer comprising a traveling conveyer-box, a trolley-cable having one end elevated above the other, hangers attached to said box and provided with pulley-wheels engaging said cable, a driving-cable attached to said hangers, gearing for driving said driving-cable, said hangers having pulley-wheels engaging said cable, said box having an inclined hinged bottom piece, weighted latches for holding said bottom piece in place, a tripping device in the path of said latches, and weighted levers for bringing said hinged bottom piece back to its normal position.

2. A wood-conveyer comprising a traveling carrier, an inclined track for said carrier, means for moving said carrier, said carrier having a bottom consisting of two inclined portions meeting at a line transverse to the movement of the carrier and one of said bottom portions being hinged, weighted latches attached to the other bottom portion for holding said hinged portion in its normal position, a tripping device in the path of said latches, and weighted levers fulcrumed on the side of said carrier and having pivotal connections with said hinged bottom portion.

3. A wood-conveyer comprising a traveling carrier, an inclined track for said carrier, hangers in two sections pivotally connected together and attached to said carrier and provided with pulleys engaging said track, a driving-cable attached to said hangers at the pivotal connections of said hangers, pulleys for said driving-cable, said hangers having pulleys engaging the lower traveling part of said cable, means for driving said cable-driving pulleys, and means for unloading said carrier.

4. A wood-conveyer comprising a traveling carrier, an inclined track for said carrier consisting of a cable attached to a fixed object at one end, a spool at the other end thereof for regulating the tension thereof, means for rotating said spool, a ratchet-wheel and dog for holding said spool against rotation after suitable tension has been obtained, hangers in two sections pivotally connected together, the lower sections being attached to said carrier and the upper sections being provided with trolley-wheels engaging said track, a driving-cable attached to the pivotal connections of said hangers, pulleys for mounting and driving said cable, shafts for said pulleys, one of said shafts being a driving-shaft, the pulley mounted on said driving-shaft having a clutch formed on the hub thereof, a sprocket-wheel having a coöperating clutch formed on the hub thereof and adapted to engage the clutch of said driving-pulley, means for throwing said sprocket-wheel in and out of mesh with said driving-pulley, means for unloading said carrier, and means for regulating the speed of said carrier when returning to its normal position.

In testimony whereof I set my hand, in the presence of two witnesses, this 30th day of September, 1905.

GEORGE G. HUGHS.

Witnesses:
A. L. JACKSON,
W. A. DARTER.